(12) United States Patent
Takeuchi et al.

(10) Patent No.: US 6,923,725 B2
(45) Date of Patent: Aug. 2, 2005

(54) TORQUE FLUCTUATION ABSORBER (75) Inventors: Makoto Takeuchi, Kariya (JP); Masaru Ebata, Chita (JP); Mototaka Nakane, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/270,007

(22) Filed: Oct. 15, 2002

(65) Prior Publication Data
US 2003/0087704 A1 May 8, 2003

(30) Foreign Application Priority Data

Oct. 17, 2001 (JP) ........................................ 2001-319626
Oct. 11, 2002 (JP) ........................................ 2002-298512

(51) Int. Cl.⁷ .............................. F16D 3/12; F16D 3/66
(52) U.S. Cl. ................. 464/68; 192/109 A; 192/113.22
(58) Field of Search ........................ 464/17, 30, 45–48, 464/68; 192/56.6, 109 A, 113.22, 113.24; 74/574

(56) References Cited

U.S. PATENT DOCUMENTS

| 2,090,397 | A | * | 8/1937 | Haupt | 192/105 C |
| 2,180,086 | A | * | 11/1939 | Kraft | 192/107 R |
| 3,323,328 | A | * | 6/1967 | Montgomery | 464/46 |
| 4,751,992 | A | * | 6/1988 | Maucher et al. | 192/103 A |
| 4,997,074 | A | * | 3/1991 | Larson et al. | 192/70.28 |
| 5,176,233 | A | * | 1/1993 | Woerner et al. | 192/48.1 |
| 5,362,276 | A | * | 11/1994 | Fuehrer et al. | 464/160 |

FOREIGN PATENT DOCUMENTS

| JP | 55020964 A | * | 2/1980 | ........... F16D/13/50 |
| JP | 2002-13547 A | | 1/2002 | |

* cited by examiner

Primary Examiner—David Bagnell
Assistant Examiner—K. Thompson
(74) Attorney, Agent, or Firm—Burns, Doane, Swecker & Mathis, LLP (57) ABSTRACT

A torque fluctuation absorber which is unlikely applied with an foreign material such as dust on a limiter portion during transporting the torque fluctuation absorber. The torque fluctuation absorber includes a flywheel for transmitting a driving force from a power source and a damper mechanism having a limiter portion which includes a frictional member being frictionally engaged with the flywheel on an external peripheral side and connected to an input shaft of a transmission on an internal peripheral side. The torque fluctuation absorber further includes a supporting mechanism for performing a frictional engagement of the frictional member by supporting the frictional member in an axial direction of a drive shaft under a condition before assembling the flywheel to the damper mechanism.

19 Claims, 7 Drawing Sheets

TORQUE FLUCTUATION ABSORBER

This application is based on and claims priority under 35 U.S.C. §119 with respect to Japanese Patent Applications No. 2001-319626 filed on Oct. 17, 2001, and No. 2002-298512 filed on Oct. 11, 2002, the entire content of which is incorporated herein by reference.

FILED OF THE INVENTION

The present invention relates to a torque fluctuation absorber. More particularly, the present invention pertains to a torque fluctuation absorber for absorbing a torque fluctuation generated between a drive power source and a transmission.

BACKGROUND OF THE INVENTION

Figure 7:
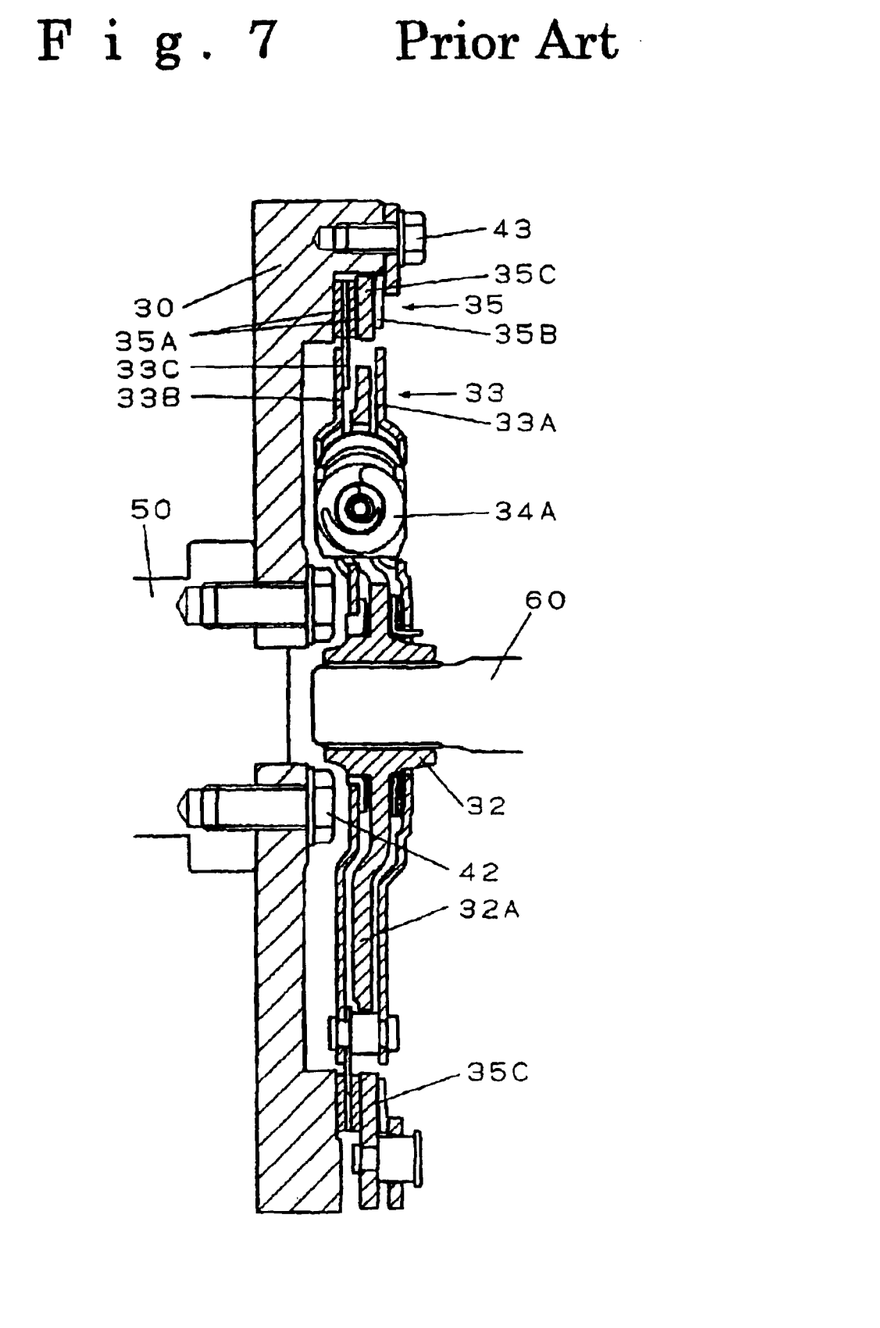
FIG. 7 is a cross-sectional view of a known torque fluctuation absorber.

A known device for absorbing the torque fluctuation between a drive power source such as an internal combustion engine and an electric motor and a transmission connected to wheels for transmitting the driving force from the drive power source such as engine disclosed in Japanese Patent Application No. 2002-13547 is shown in FIG. 7. As shown in FIG. 7, the device for absorbing the torque fluctuation is positioned between a drive shaft 50 of the drive power source (not shown) and an input shaft 60 of the transmission. The device for absorbing the toque fluctuation includes a flywheel 30 fixed to the drive shaft 50 on the input shaft 60 side and a damper mechanism 33 provided between the flywheel 30 and the input shaft 60 of the transmission for absorbing the torque fluctuation of the flywheel 30 to transmit to the input shaft 60. The damper mechanism 33 includes discs 33A. 33B extended in an external peripheral side, a hub 32 including a flange 32A, damper members 34A provided on a hub portion between the hub 32 and the flange 32A in radial direction, and a limiter portion 35 for interrupting the transmission of the driving force from the flywheel 30 to the hub 32 when the fluctuation torque between the damper mechanism 33 and the flywheel 30 reaches a predetermined value. The damper mechanism 33 is engaged with the flywheel 30 via the limiter portion 35. An internal peripherally of the hub 32 is connected to the input shaft 60 via splines. The damper mechanism 33 is constructed to absorb the torque fluctuation generated between the discs 33A, 33B and the flange 32A respectively. The limiter portion 35 includes a friction member 35A fixed to the external periphery of the disc, a biasing member 35B for biasing the friction member 35A towards the fly wheel 30, and a limiter plate 35C provided between the biasing member 35B land the friction member 35A.

The driving force from the drive power source is transmitted to the flywheel 30 via the drive shaft 50 and the driving force is transmitted to the discs 33A, 33B via the limiter portion 35 on the external peripheral side of the flywheel 30. When the discs 33A, 33B are rotated by the driving force transmitted to the discs 33A, 33B, the driving force is transmitted to the flange 32A via the damper members 34A. In this case, the permissible torque fluctuation of the damper members 34A is absorbed based on the absorbing characteristics of the torque by the damper members 34A and is transmitted to the input shaft 60 via the flange 32A. When a relative rotational amount between the discs 33A, 33B and the hub 32 during transmitting the driving force reaches a predetermined value, the relative rotation is regulated. When the torque fluctuation is further generated so that the torque fluctuation exceeds an allowable frictional engagement range of a frictional engagement between the fictional member 35A and the flywheel 30, the limiter portion 35 is operated so that the frictional member 35A and the hub 32 are unitarily rotated relative to the flywheel 30.

When the known device for absorbing the torque fluctuation with the foregoing construction is assembled to a vehicle, the flywheel 30 is fixed to the drive shaft 50 with bolts 42 under a condition that the flywheel 30 and the damper mechanism 33 are separated. Then, the frictional member 35A of the damper mechanism 33 is frictionally engaged with the flywheel 30 by tightening bolts 43 via the limiter plate 35C and the biasing member 35B while facing a shaft core of the damper mechanism 33 to the flywheel 30 fixed to the drive shaft 50 to install the flywheel 30 to the damper mechanism 33. By inserting the input shaft 60 into a hub 32 of the damper mechanism 33 to fit an internal periphery of the hub 32, the assembling of the known device for absorbing the torque fluctuation to the vehicle is completed.

With the construction of the known device for absorbing the torque fluctuation, the flywheel 30 cannot be assembled to the drive shaft 50 of the vehicle unless the flywheel 30 and the damper mechanism 33 are separated. Thus, when transporting the known device for absorbing the torque fluctuation before assembling to the vehicle, the flywheel 30 and the damper mechanism 33 are separated considering the assembling performance of the device for absorbing the torque fluctuation to the vehicle.

Notwithstanding, with the construction shown in FIG. 7, approximately the whole portion of the limiter portion 35 including a radial directional external peripheral surface of the limiter portion 35 is exposed to the external ambient under the condition that the flywheel 30 and the damper mechanism 33 are separated. Thus, by transporting the flywheel 30 and the damper mechanism 33 as separated parts, foreign materials such as dust are apt to be attached to the frictional member 35A of the limiter 35 during transporting the separated parts. The application of the foreign material such as dust may particularly influence on an initial frictional characteristics of the frictional member 35A. For example, this includes a drawback that the frictional characteristics of the frictional member 35A differ depending on every vehicle.

A need thus exists for a torque fluctuation absorber which is unlikely attached with an foreign material such as dust on a limiter portion during transporting the torque fluctuation absorber.

SUMMARY OF THE INVENTION

In light of the foregoing, the present invention provides a torque fluctuation absorber which includes a flywheel fixed to a drive shaft for transmitting a driving force from a power source via the drive shaft, a damper mechanism provided on the flywheel and having a limiter portion including a frictional member directly or indirectly frictionally engaged with the flywheel on an external peripheral side and connected to an input shaft of a transmission on an internal peripheral side, and a supporting mechanism for performing a frictional engagement of the frictional member by supporting the frictional member of the limiter portion in an axial direction of the drive shaft under a condition before assembling the damper mechanism to the flywheel or for fixing the torque fluctuation absorber to the drive shaft under a condition that the frictional member and the flywheel are frictionally engaged by supporting the frictional member of the limiter portion in the axial direction of the drive shaft.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
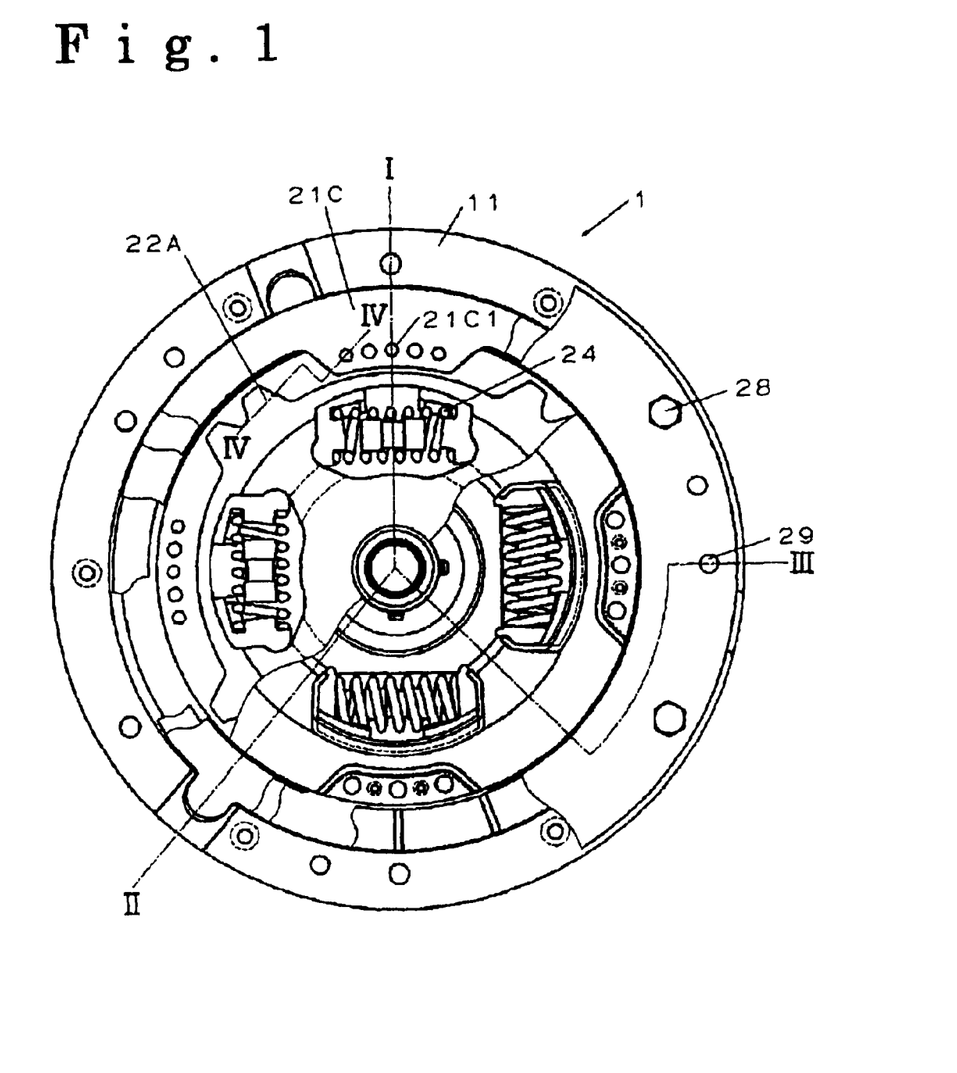
FIG. 1 is a plane view partially cut for showing internal members of a torque fluctuation absorber according to a first embodiment of the present invention.
Figure 2:
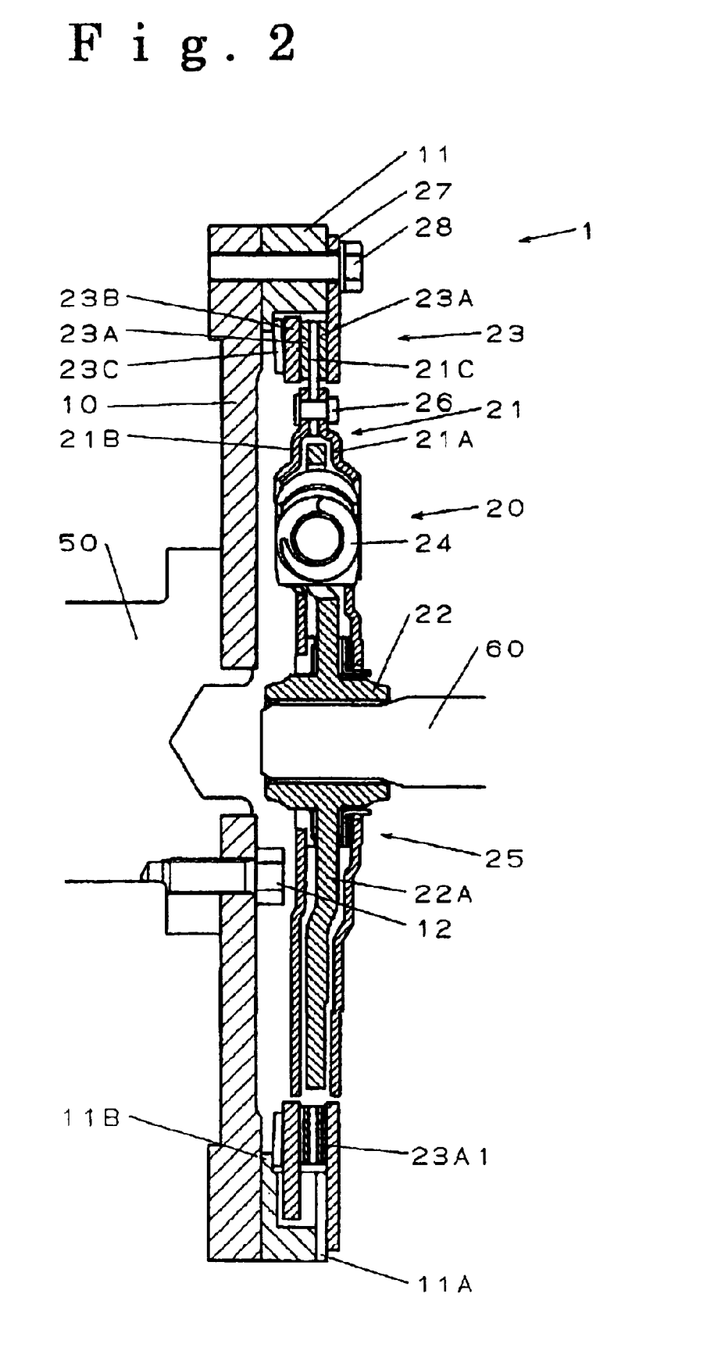
FIG. 2 is a view taken on line I–II of FIG. 1.
Figure 3:
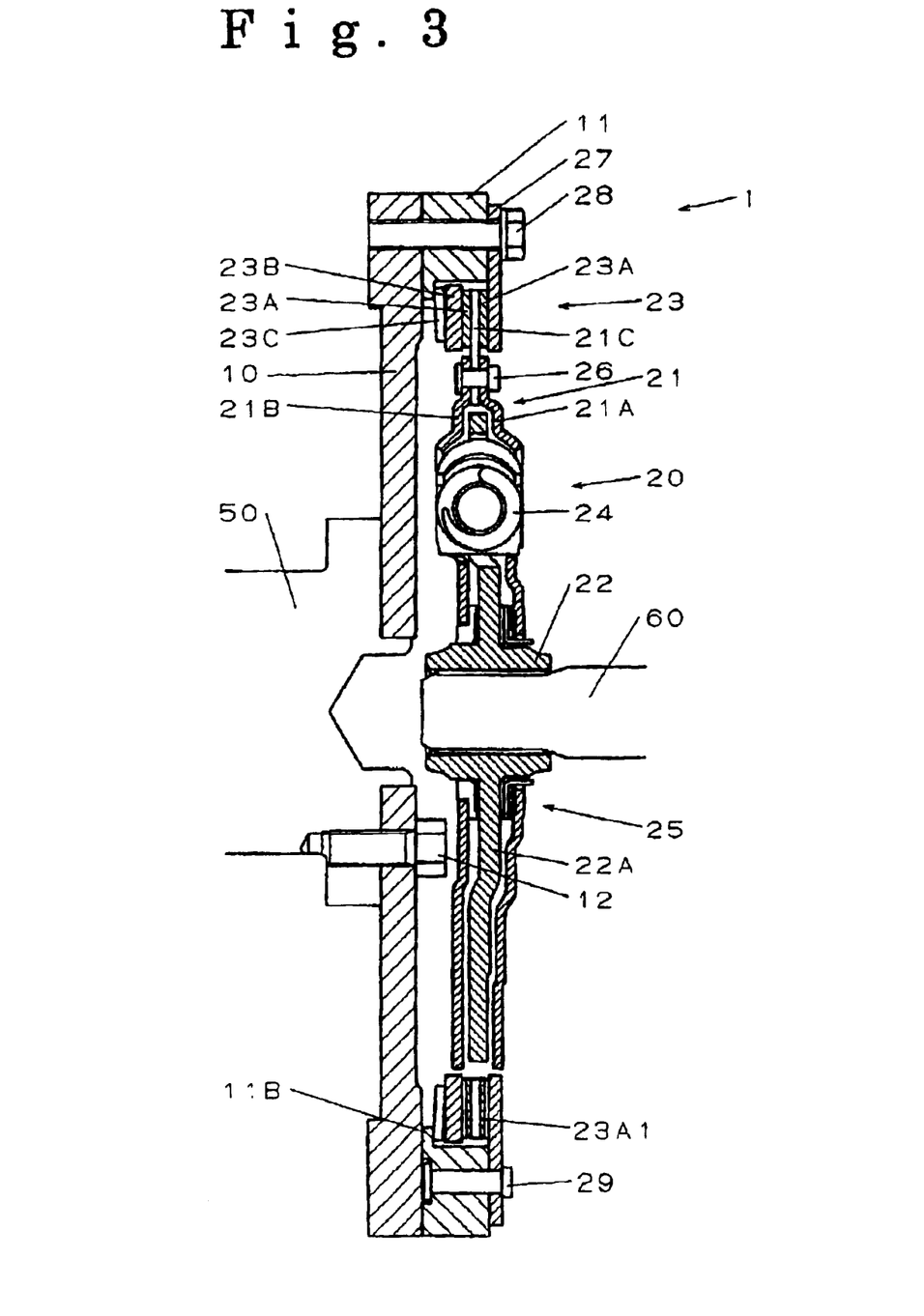
FIG. 3 is a view taken on line I–III of FIG. 1.

A first embodiment of a torque fluctuation absorber will be explained with reference to FIGS. 1–2. A torque fluctuation absorber 1 includes a flywheel connected to a drive shaft 50 with bolts 12 for transmitting the driving force from an engine serving as a drive power source via the drive shaft 50 and a damper mechanism 20 having a limiter portion on an external peripheral side and connected to an input shaft of a transmission at an internal peripheral side thereof. The torque fluctuation absorber 1 further includes a supporting mechanism for performing the frictional engagement of frictional members 23A of a limiter portion 23 by supporting the frictional members 23A in an axial direction of the drive shaft 50 under the condition that the damper mechanism 20 is assembled to the flywheel 10.

The damper mechanism 20 includes a circular disc 21 including two first discs 21A, 21B which are facing each other in axial direction and a second disc 21C having rivet bores 23C1 for inserting rivets 26 and connected between the first discs 21A, 21B via the rivets 26 and extended in external radial direction. The damper mechanism 20 further includes a hub 22 unitary including a flange 22A and damper members 24 provided between the hub 22 and the disc 21 which are arranged in a peripheral direction. The hub 22 is connected to an input shaft 60 by the engagement of splines formed on the internal surface of the hub 22 with splines formed on an external surface of the input shaft 60. The damper members 24 correspond to coil springs. Four damper members 24 are arranged keeping approximately even intervals in a peripheral direction for restraining the fluctuation of the torque.

Figure 4:
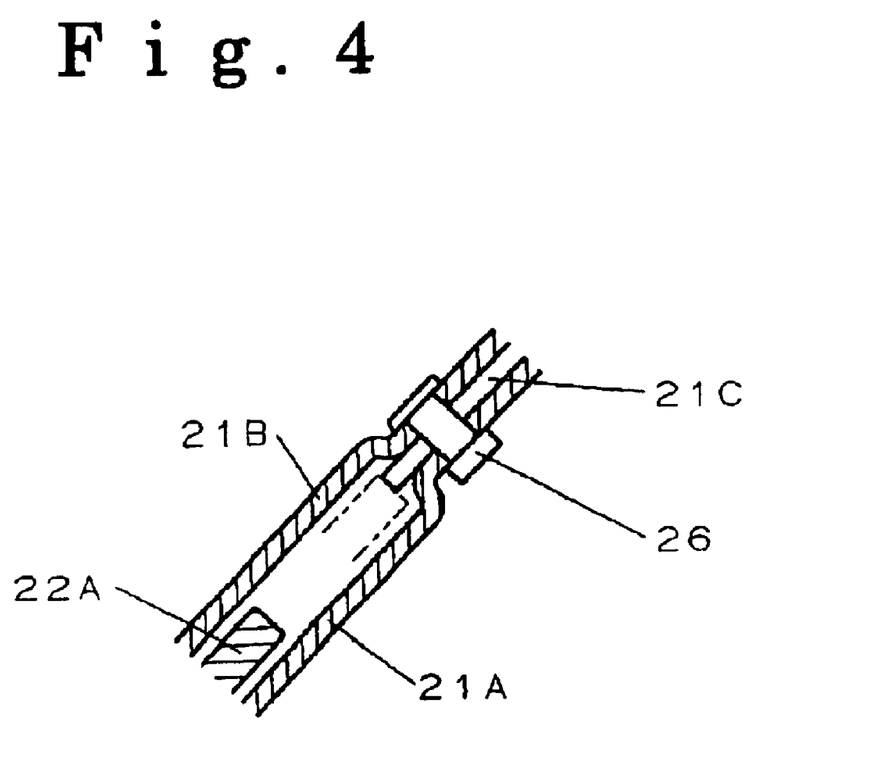
FIG. 4 is a view taken on line IV—IV of FIG. 1.

As shown in FIG. 4, a portion of the flange 22A extended outward in radial direction and a portion of the second disc 21C extended inward in radial direction are configured to be overlapped with each other in radial direction. The flange 22A is positioned at an actual line of FIG. 4 under the condition that there is no torque fluctuation between the drive shaft 50 and the input shaft 60. When the torque fluctuation is generated between the drive shaft 50 and the input shaft 60, the second disc 21C and the flange 22A are relatively rotated so that the flange 22A is shifted to a dotted line of FIG. 4. When the flange 22A is positioned at the dotted line of FIG. 4, further relative rotation is restricted between the second disc 21C and the flange 22A.

The supporting mechanism includes an annular member 11 fixed to a surface (i.e., right side surface of FIG. 2) which is opposite side of the drive shaft 50 in the axial direction of the flywheel 10 for covering a radially external peripheral surface of the limiter portion 23, an extended portion 11B extended toward internal peripheral side from the annular member 11 on the flywheel 10 of the annular member 11, a supporting plate 27 for supporting the limiter portion 23 in the axial direction along with the extended portion 11B, and rivets 29 for fixing the supporting plate 27 and the annular member 11. The torque fluctuation absorber 1 is fixed to the flywheel 10 via bolts 28.

The construction of the limiter portion 23 of the damper mechanism 20 will be explained as follows. The limiter portion 23 includes the annular frictional members 23A, a limiter plate 23B and a belleville spring 23C serving as a biasing member. The annular frictional members 23A, the limiter plate 23B and the belleville spring 23C are provided between the annular member 11 and the supporting plate 27. The limiter plate 23B is provided between the extended portion 11B and one of the annular frictional members 23A on the flywheel side. The belleville spring 23C is provided between the limiter plate 23B and the extended portion 11B for biasing the limiter plate 23B departing from the flywheel 10. The annular frictional members 23A sandwiching the second disc 21C are provided between the limiter plate 23B and the supporting plate 27. The limiter portion 23 interrupts the transmission of the torque between the drive shaft 50 and the input shaft 60 when the fluctuation of the torque between the drive shaft 50 and the input shaft 60 reaches a predetermined value.

The annular member 11 is formed with grooves 11A for communicating a radially external periphery side of the limiter portion 23 and the radially external periphery side of the annular member 11. The grooves 11A are provided for exhausting the abraded dust of the frictional member 23A generated when rotating the limiter portion 23 relative to the annular member 11 by the fluctuation of the transmitted torque by the centrifugal force to the external ambient. Further, the frictional member 23A is formed with slits 23A1 for communicating the radially internal periphery side of the frictional member 23A and the radially external periphery side of the frictional member 23A (i.e., refer to the frictional members 23A on bottom of FIG. 2). Likewise the grooves 11A, the slits 23A1 are provided for exhausting the abraded dust of the frictional member 23A to the external ambient by the centrifugal force.

The torque fluctuation absorber according to the first embodiment includes a hysteresis mechanism 25 for generating the hysteresis between the flange 22A and the first disc 21A. An operation of the damper mechanism 20 with the foregoing construction will be explained as follows. When the engine is driven, the flywheel 10 is rotated in accordance with the drive of the drive shaft 50. When the fluctuation torque is smaller than a predetermined value, the rotational torque is transmitted to the disc 21 via the limiter portion 23 to rotate the disc 21. The rotational torque of the disc 21 is transmitted from the flange 22A to the hub 22 via the damper member 24. The hub 22 is rotated while the damper member 24 is elastically compressed or expanded in accordance with the fluctuation torque. Thus, the drive force of the drive shaft 50 is transmitted to the input shaft 60 via the damper mechanism 20. With the elastic compression of the damper member 24 to shift the flange 22A at the dotted line of FIG. 4, the relative rotation between the second disc 21C and the flange 22A is restricted not to allow further elastic compression of the damper member 24.

When the drive torque of the engine becomes larger compared to the foregoing condition and the fluctuation torque between the flywheel 10 and the hub 22 reaches the predetermined value (i.e., corresponding to the condition that the fluctuation torque reaches the maximum torque which maintains the frictional engagement of the frictional member 23A in the rotational direction between the limiter plate 23B and the supporting plate 27), the frictional member 23A starts to slip not to transmit the fluctuation torque equal to or greater than the predetermined value between the disc 21 and the hub 22. Although the frictional member 23A is supported between the limiter plate 23B and the supporting plate 27 in the torque fluctuation absorber of the first embodiment, the frictional member 23A may be positioned between part of the annular member 11 and the limiter plate 23B so that the frictional member 23A slips relative to the flywheel 10 when the fluctuation torque reaches the predetermined value.

The assembling process of the torque fluctuation absorber 1 with the foregoing construction to the vehicle will be explained as follows. Normally, various parts and devices of the vehicle are collected in the assembly plant as assembly units for assembling the collected each parts and devices when manufacturing the vehicle. In this case, the parts and the devices prearranged as assemblies are transported to the assembly plant and are assembled to other parts or devices in the assembly plant.

In the assembly plant, the engine and the transmission is assembled via the torque fluctuation absorber 1. Because the limiter portion 23 is supported by the annular member 11 by the extended portion 11B and the supporting plate 27, the flywheel 10 can be separated under the condition that the damper mechanism 20 and the annular member 11 are unitary assembled. When installing in the vehicle, first, the separated flywheel 10 is connected to the drive shaft 50 with the bolts 12, then the pre-assembled damper mechanism 20 and the annular member 11 with the rivets 29 as a unitary unit are assembled to the flywheel 10 with bolts 28. Thus, for installing the torque fluctuation absorber 1 in the vehicle, the torque fluctuation absorber 1 can be transported under the condition that the damper mechanism 20 is assembled to the annular member 11, that is, under the condition that the external peripheral surface of the limiter portion 23 is covered with the annular member 11. Thus, the application of the foreign material such as dust to the limiter portion 23 during transporting the device as an assembly to the assembly plant can be reduced.

Figure 5:
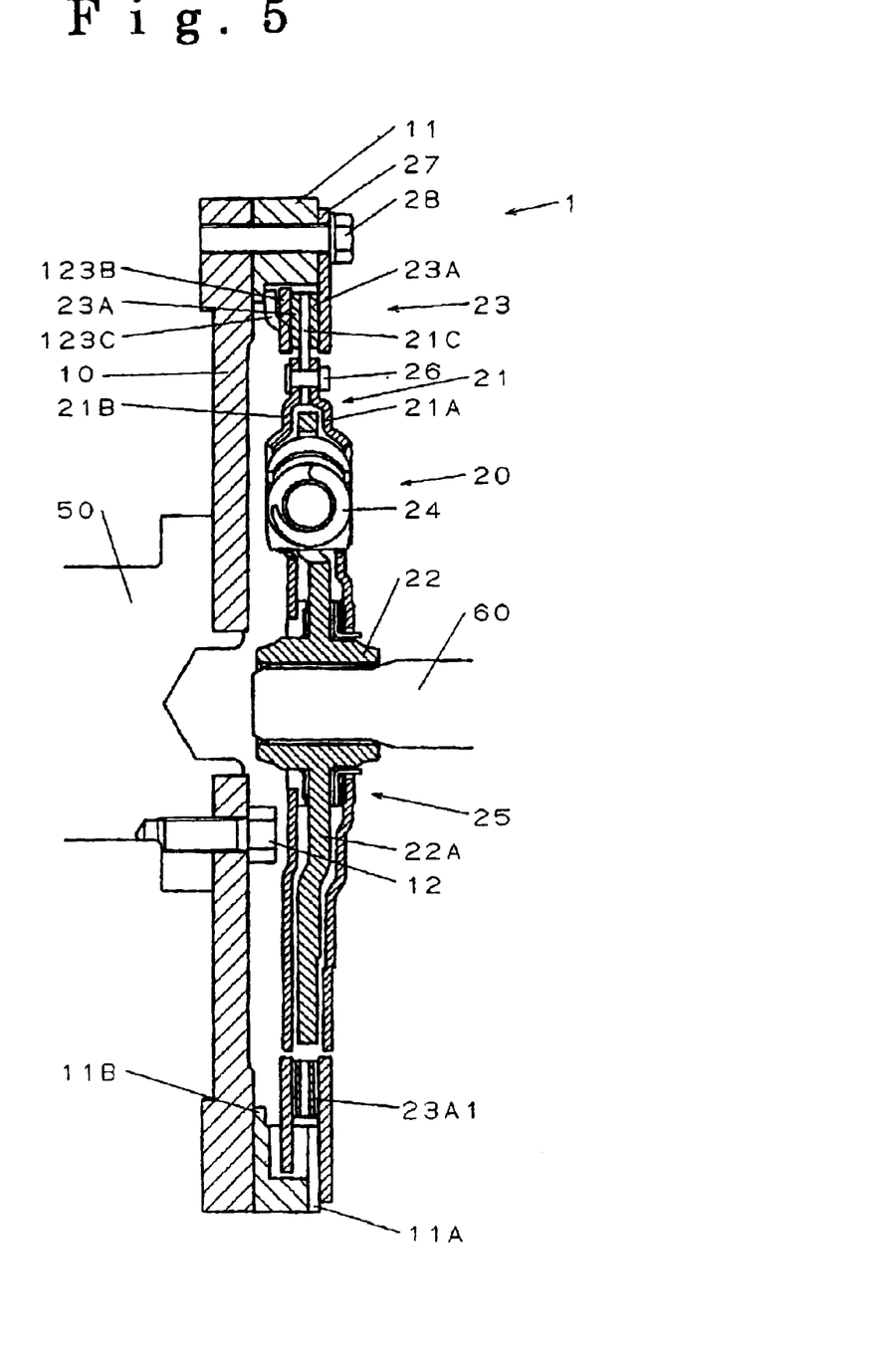
FIG. 5 is a cross-sectional view showing a variation of a torque fluctuation absorber of the first embodiment of the present invention.

FIG. 5 shows a cross-sectional view of a variation of the torque fluctuation absorber 1 of the first embodiment. The construction of the variation of the torque fluctuation absorber 1 is the same with the first embodiment except the point that the limiter plate and the biasing member are formed in one piece. With the variation shown in FIG. 5, biasing members 123C are formed on plural positions of a limiter plate 123B in peripheral direction in one piece by stamping the metal made limiter plate 123B. With this construction, the number of the parts of the limiter portion 23 is reduced and the assembling time is shortened.

Figure 6:
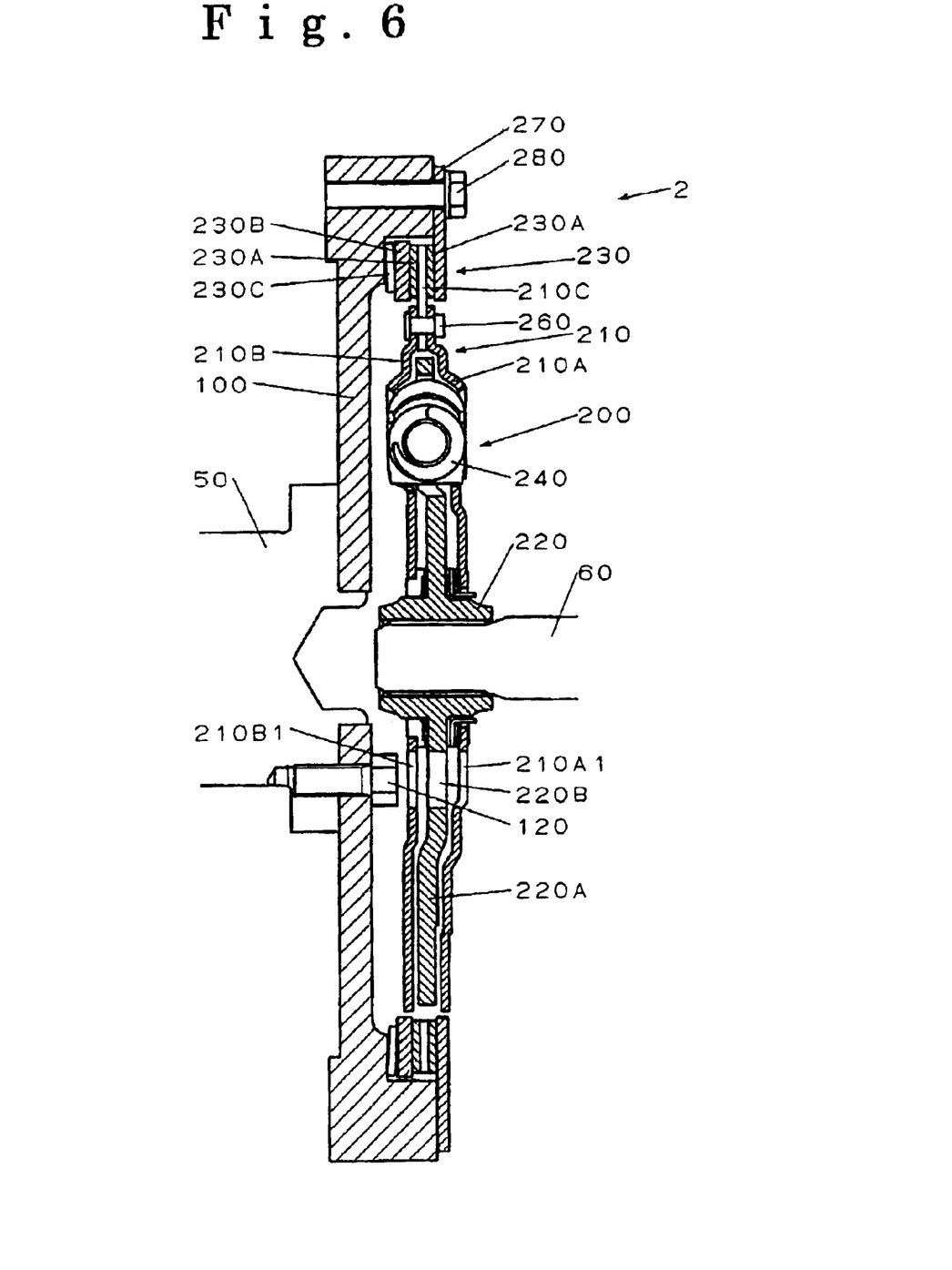
FIG. 6 is a cross-sectional view of the torque fluctuation absorber according to a second embodiment of the present invention.

A second embodiment of the torque fluctuation absorber will be explained with reference to FIG. 6.

The torque fluctuation absorber 2 includes a flywheel 100 connected to a drive shaft 50 for transmitting the driving force from the engine serving as the drive source via the drive shaft 50, a damper mechanism 200 having a limiter portion 230 on an external peripheral side and connected to an input shaft 60 of the transmission at an internal peripheral side, and a supporting mechanism which enables to fix frictionally engaged frictional member 230A and the flywheel 100 to the drive shaft 50 by supporting the frictional member 230A of the limiter portion 230 in the axial direction of the drive shaft 50.

The damper mechanism 200 of the second embodiment of the torque fluctuation absorber includes a circular disc 210, a hub 220 unitary including a flange 220A, and a damper member 240 provided between the hub 220 and the disc 210 in peripheral direction. The disc 210 includes two first discs 210A, 210B opposing each other in the axial direction and a second disc 210C connected between the first discs 210A, 210B via rivets 260 and extended in the radial external direction.

The supporting mechanism includes a supporting plate 270 connected to the flywheel 100 for supporting the frictional member 230A in the axial direction between the flywheel 100, and through holes 210A1, 210B1, 220B, which are provided penetrating the first discs 210A, 210B, and the flange 220A in the axial direction respectively and in which bolts 120 serving as tightening members for fixing the flywheel 10 to the drive shaft 50 can be tightened. The flywheel 10 is constructed to cover the radially external peripheral surface of the limiter portion 230 at the radially external periphery side. The supporting plate 270 is fixed to the flywheel 100 with bolts 280.

The disc 210 is formed with first through holes 210A1, 210B1 penetrating the first discs 210A, 210B in the axial direction. A flange 220A of the hub 220 is formed with a second through hole 220B penetrating the flange 220A in the axial direction. The size of the first through holes 210A1, 210B1 and the second through hole 220B corresponds to the size through which a tool for tightening the bolts 120 can be penetrated under the condition that the first through holes 210A1, 210B1 and the second through hole 220B are overlapped in the peripheral direction.

Grooves (not shown; corresponding to the grooves 11A of the first embodiment) for communicating the radially external periphery side of the limiter portion 230 and the radially external periphery side of the flywheel 100 maybe formed on the flywheel 100. Further, slits communicating the radially internal periphery side of frictional members 230A and the radially external periphery side of the frictional members 230A may be formed on the frictional members 230A.

Because the operation of the torque fluctuation absorber 2 of the second embodiment corresponds to the operation the torque fluctuation absorber 1 of the first embodiment, the explanation is not repeated.

The assembling of the torque fluctuation absorber 2 of the second embodiment to the vehicle will be explained as follows. When assembling the torque fluctuation absorber 2 to the vehicle, the bolts 120 can be screwed to the drive shaft 50 via the first through holes 210A1, 210B1 and the second through hole 220B while the flywheel 100 and the damper mechanism 200 are unitary assembly.

Thus, for assembling the torque fluctuation absorber 2 to the vehicle, the torque fluctuation absorber 2 can be transported to the assembly plant under the condition that the flywheel and the damper mechanism 200 are unitary formed, that is, under the condition that the external peripheral surface of the limiter portion 230 is covered with the flywheel 100. Thus, it is preferable for reducing the application of the foreign material such as dust on the limiter portion 230 during transporting the torque fluctuation absorber 2 to the assembly plant. Although the frictional member 230A is supported between the limiter plate 230B and the supporting plate 270 in the torque fluctuation absorber of the second embodiment, the frictional member 230A may be positioned between the flywheel 100 and the limiter plate 230B so that the frictional member 230A slips relative to the flywheel 100 when the fluctuation torque reaches the predetermined value.

According to the embodiments of the torque fluctuation absorber of the present invention, the frictional member is frictionally engaged by supporting the frictional member in the axial direction of the drive shaft under the condition before assembling the damper mechanism to the flywheel by the supporting mechanism, or, the torque fluctuation absorber can be fixed to the drive shaft under the condition that the frictional member and the flywheel are frictionally engaged by supporting the frictional member in the axial direction of the drive shaft. Thus, the torque fluctuation absorber can be transported without exposing the frictional member of the limiter portion, and the application of the foreign material such as dust to the limiter portion during the transportation process can be reduced.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A torque fluctuation absorber comprising:
   a flywheel fixed to a drive shaft for transmitting a driving force from a power source via the drive shaft;
   a damper mechanism provided on the flywheel and having a limiter portion adapted to interrupt torque transmission between the drive shaft and an input shaft when torque fluctuation between the drive shaft and the input shaft reaches a predetermined level, the limiter portion including a frictional member directly or indirectly frictionally engaged with the flywheel and connected to an input shaft of a transmission;
   a supporting mechanism supporting the frictional member of the limiter portion in an axial direction of the drive shaft to provide the frictional engagement of the frictional member before the damper mechanism is assembled to the flywheel;
   the supporting mechanism comprising an annular member fixed to the flywheel for covering a radially external peripheral surface of the limiter portion and having an extended portion extended in a radially inward direction and a supporting plate fixed to the annular member for supporting the frictional member in the axial direction between the extended portion and the supporting plate; and
   the limiter portion of the damper mechanism including the frictional member provided on one side of a disc in the axial direction and another frictional member provided on an opposite side of the disc, a limiter plate provided between the frictional member provided on the flywheel side in the axial direction and the extended portion, and a biasing member provided between the limiter plate and the extended portion for biasing the limiter plate away from the flywheel.

2. A torque fluctuation absorber according to claim 1, wherein the annular member covers the radially external peripheral surface of the limiter portion under fixed condition to the flywheel.

3. A torque fluctuation absorber according to claim 1, wherein the annular member is fixed to a side surface of the flywheel opposite to the power source in the axial direction of the flywheel, the extended portion is extended inward on the flywheel side of the annular member, and the supporting plate is fixed to a transmission side of the annular member in the axial direction.

4. A torque fluctuation absorber according to claim 1, further comprising a groove formed on the annular member for communicating a radially external periphery side of the limiter portion and a radially external periphery side of the annular member.

5. A torque fluctuation absorber according to claim 1, wherein the limiter plate and the biasing member are formed in one piece.

6. A torque fluctuation absorber according to claim 1, wherein the frictional member comprises a slit for communicating a radially internal periphery side of the frictional member and a radially external periphery side of the frictional member.

7. A torque fluctuation absorber according to claim 1, wherein the supporting mechanism comprises an annular member fixed to the flywheel by bolts, the annular member comprising an inwardly extending extended portion, and the limiter portion comprises a spring positioned between the extended portion of the annular member and the fictional member.

8. A torque fluctuation absorber according to claim 1, wherein the supporting mechanism comprises an annular member fixed to the flywheel by bolts, the limiter portion comprising a plurality of frictional members, a limiter plate and a spring, the annular member having an outer peripheral portion covering the spring, the plurality of frictional members and the limiter plate.

9. A torque fluctuation absorber according to claim 1, wherein the supporting mechanism comprises an annular member fixed to the flywheel by bolts, the annular member comprising an inwardly extending extended portion, and the limiter portion comprises a limiter plate and a spring contacting the extended portion of the annular member and the limiter plate.

10. A torque fluctuation absorber according to claim 1, wherein the damper mechanism comprises a circular disc, a unitary hub including a flange, a damper member provided between the hub and the disc in a peripheral direction; and wherein the supporting mechanism comprises a supporting plate fixed to the flywheel for supporting the frictional member between the flywheel and the supporting plate in the axial direction and a through hole penetrating the disc and the flange respectively in the axial direction for tightening members for fixing the flywheel to the drive shaft.

11. A torque fluctuation absorber according to claim 10, wherein the flywheel covers a radially external peripheral surface of the limiter portion under a condition supporting the frictional member along with the supporting plate.

12. A torque fluctuation absorber according to claim 10, wherein the through hole comprises a first through hole penetrating the disc and a second through hole penetrating the flange; and wherein a size of the first through hole and the second through hole corresponds to a size for enabling tightening the tightening member under a condition that the first through hole and the second through hole are overlapped in the peripheral direction.

13. A torque fluctuation absorber according to claim 10, wherein the flywheel comprising a groove for communicating a radially external periphery side of the limiter portion and a radially external periphery side of the flywheel.

14. A torque fluctuation absorber according to claim 10, wherein the limiter portion of the damper mechanism comprises the frictional member provided on both sides of the disc in an axial direction, a limiter plate provided between the frictional member provided on the flywheel sidle in the axial indirection and the flywheel, and a biasing member provided between the limiter plate and the flywheel for biasing the limiter plate away from the flywheel.

15. A torque fluctuation absorber according to claim 14, wherein the limiter plate and the biasing member are formed in one piece.

16. A torque fluctuation absorber comprising:

a flywheel fixed to a drive shaft for transmitting a driving force from a power source via the drive shaft;

a damper mechanism provided on the flywheel and having a limiter portion including a frictional member directly or indirectly frictionally engaged with the flywheel and connected to an input shaft of a transmission, the damper mechanism comprising a circular disc, a unitary hub including a flange, and a damper member provided between the hub and the disc in a peripheral direction; and a supporting mechanism supporting the frictional member of the limiter portion in an axial direction of the drive shaft for providing the frictional engagement of the frictional member, the supporting mechanism comprising a supporting plate fixed to the flywheel for supporting the frictional member between the flywheel and the supporting plate in the axial direction and a through hole penetrating the disc and the flange respectively in the axial direction for tightening members for fixing the flywheel to the drive shaft.

17. A torque fluctuation absorber comprising:

a flywheel fixed to a drive shaft for transmitting a driving force from a power source via the drive shaft;

a damper mechanism provided on the flywheel and having a limiter portion adapted to interrupt torque transmission between the drive shaft and an input shaft when torque fluctuation between the drive shaft and the input shaft reaches a predetermined level, the limiter portion including a frictional member directly or indirectly frictionally engaged with the flywheel and connected to an input shaft of a transmission;

a supporting mechanism supporting the frictional member of the limiter portion in the axial direction of the drive shaft to provide the frictional engagement of the frictional member to permit the frictionally engaged frictional member and the flywheel to be fixed to the drive shaft;

the supporting mechanism comprising an annular member fixed to the flywheel for covering a radially external peripheral surface of the limiter portion and having an extended portion extended in a radially inward direction and a supporting plate fixed to the annular member for supporting the frictional member in the axial direction between the extended portion and the supporting plate; and the limiter portion of the damper mechanism comprising the frictional member provided on one side of a disc in the axial direction and another frictional member provided on an opposite side of the disc, a limiter plate provided between the frictional member provided on the flywheel side in the axial direction and the extended portion, and a biasing member provided between the limiter plate and the extended portion for biasing the limiter plate away from the flywheel.

18. A torque fluctuation absorber according to claim 17, wherein the limiter plate and the biasing member are formed in one piece.

19. A torque fluctuation absorber according to claim 17, wherein one of the frictional members comprises a slit for communicating a radially internal periphery side of the frictional member and a radially external periphery side of the frictional member.

* * * * *